Figure 1:
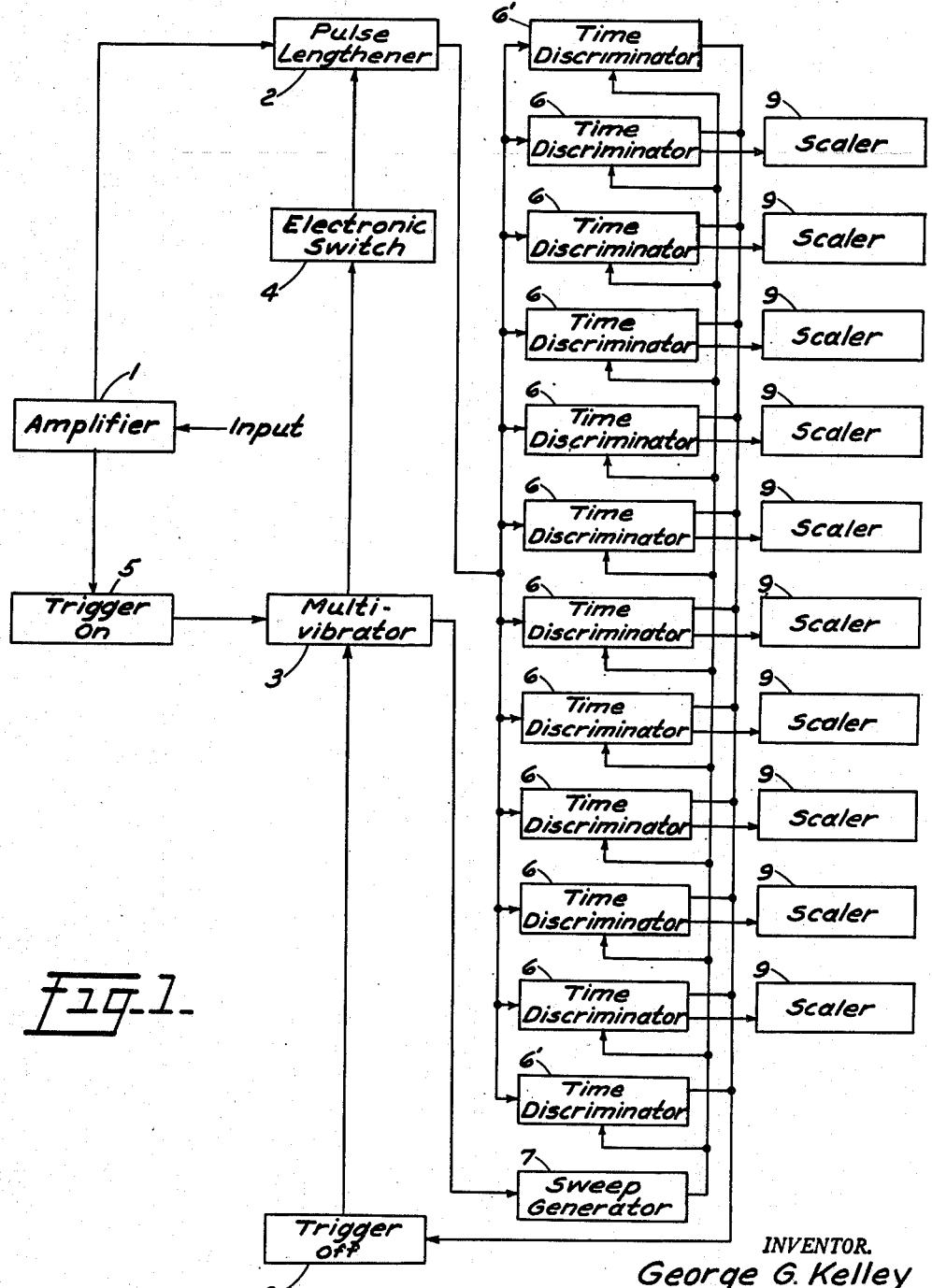

INVENTOR.
George G. Kelley

June 16, 1953   G. G. KELLEY   2,642,527
MULTICHANNEL ANALYZER
Filed May 7, 1951   4 Sheets-Sheet 4

INVENTOR.
George G. Kelley
BY
Roland A. Anderson
ATTORNEY

Patented June 16, 1953

2,642,527

UNITED STATES PATENT OFFICE 2,642,527

MULTICHANNEL ANALYZER

George G. Kelley, Oak Ridge, Tenn., assignor to the United States of America as represented by the United States Atomic Energy Commission Application May 7, 1951, Serial No. 224,895

12 Claims. (Cl. 250—27)

My invention relates to pulse analyzers for measuring magnitude distribution and more particularly to multi-channel analyzers employed in the precision sorting of pulses according to magnitude, and is especially useful in connection with the scintillation spectrometer or proportional counter.

In the field of experimental nuclear physics the need often arises for a determination of counting-rate density as a function of the amplitude of a distribution of electrical pulses. For instance, advancement in the technique of nuclear research has made it possible to obtain much significant data from the shape, size and distribution of voltage pulses. The scintillation spectrometer and/or other devices may be used to produce voltage pulses whose amplitudes are proportional to the energy of an incidence radiation. In order to determine the energy spectrum of a source of radiation, a means for sorting the voltage pulses according to size must be employed. Many techniques have been used to obtain this information, none of which have been found to be entirely satisfactory. There are limitations of speed, accuracy, ease of extracting information, and ease of calibration. The most versatile and convenient technique today employs an electronic differential pulse height analyzer of one or more channels. Examples of such analyzers may be found in F. F. Freundlich et al., on "A pulse analyzer for nuclear research" found at pages 90–100, Review of Scientific Instruments, vol. 18, 1947; Ghiorso et al., Report CC–3387 of Argonne Laboratory on "A 48 channel pulse height analyzer"; and Watkins on "10 channel electrostatic analyzer" found in Review of Scientific Instruments, vol. 20, pages 495–499 of 1949.

Features of such a device based on requirements will be mentioned. Acceptance of the limitations on speed imposed by the most generally used detection device, the scintillation phosphor, provide a practical limit on the resolving time needed in the analyzer of several microseconds. It is desirable not to allow the analyzer to limit the maximum usable counting rate because the rate at which information (i. e. pulses in a certain channel) is collected may be very close even with a source of maximum usable intensity because only a small protion of the total count is recorded. When the pulses of interest are those only which occur in co-incidence with pulses from another detector, the counting rate will be even slower.

Allowable error in channel width and position is of the order of 1% because for practical reasons it is seldom desired to count long enough to reduce the probable statistical error below this order of magnitude. The 1% specification on channel width naturally is for the minimum channel width used, which in turn depends on the amplitude resolving power of the detection equipment. With present detectors a window may cover 3% of the spectrum without affecting the overall resolution appreciably. The analyzer of Francis et al., described in the March 1951 issue of Review of Scientific Instruments, meets these specifications and principles and a number of these devices might be placed in tandem to allow several channels to be counted simultaneously. The complexity of such an arrangement has been such a deterrent that it has not been found feasible. Other known multi-channel units have not been found suitable because of a failure to meet one or more of the above requirements.

Applicant with a knowledge of the problems of the prior art has for an object of his invention the provision of a multi-channel analyzer which eliminates components by employing a new mode of operation that minimizes duplication of such components from channel to channel.

Applicant has as another object of his invention the provision of a multi-channel analyzer which obviates unnecessary duplication of elements and eliminates the use of anti-coincidence circuitry.

Applicant has as a further object of his invention the provision of a multi-channel analyzer employing a time sequence discriminator for selecting the appropriate channel for counting.

Applicant has as a still further object of his invention the provision of a multi-channel analyzer having an improved pulse lengthener circuit for insuring the proper operation of the time sequence discriminator channels.

Applicant has as a still further object of his invention the use of a multi-channel analyzer which incorporates an improved type of amplifier that responds much faster and enables the analyzer to accept much more rapid input signals.

Other objects and advantages of my invention will appear from the following specification and accompanying drawings, and the novel features thereof will be particularly pointed out in the annexed claims.

Figure 2A:
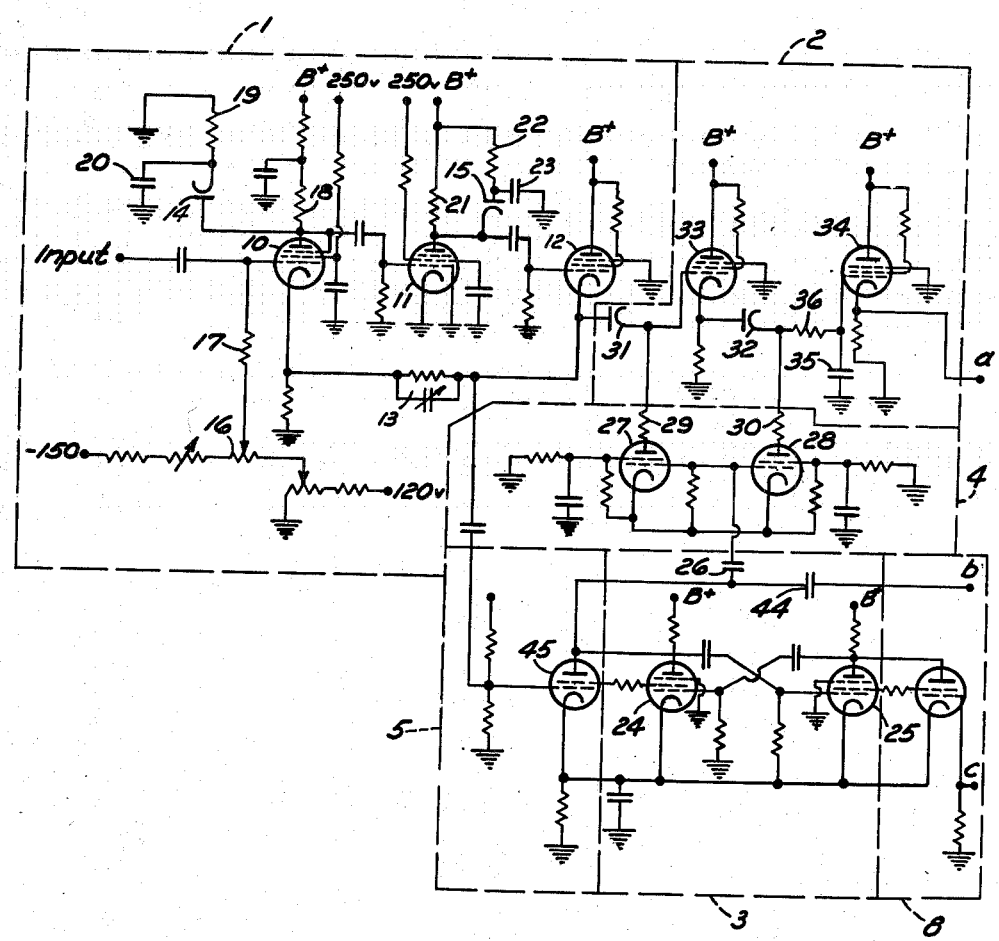
Figure 2B:
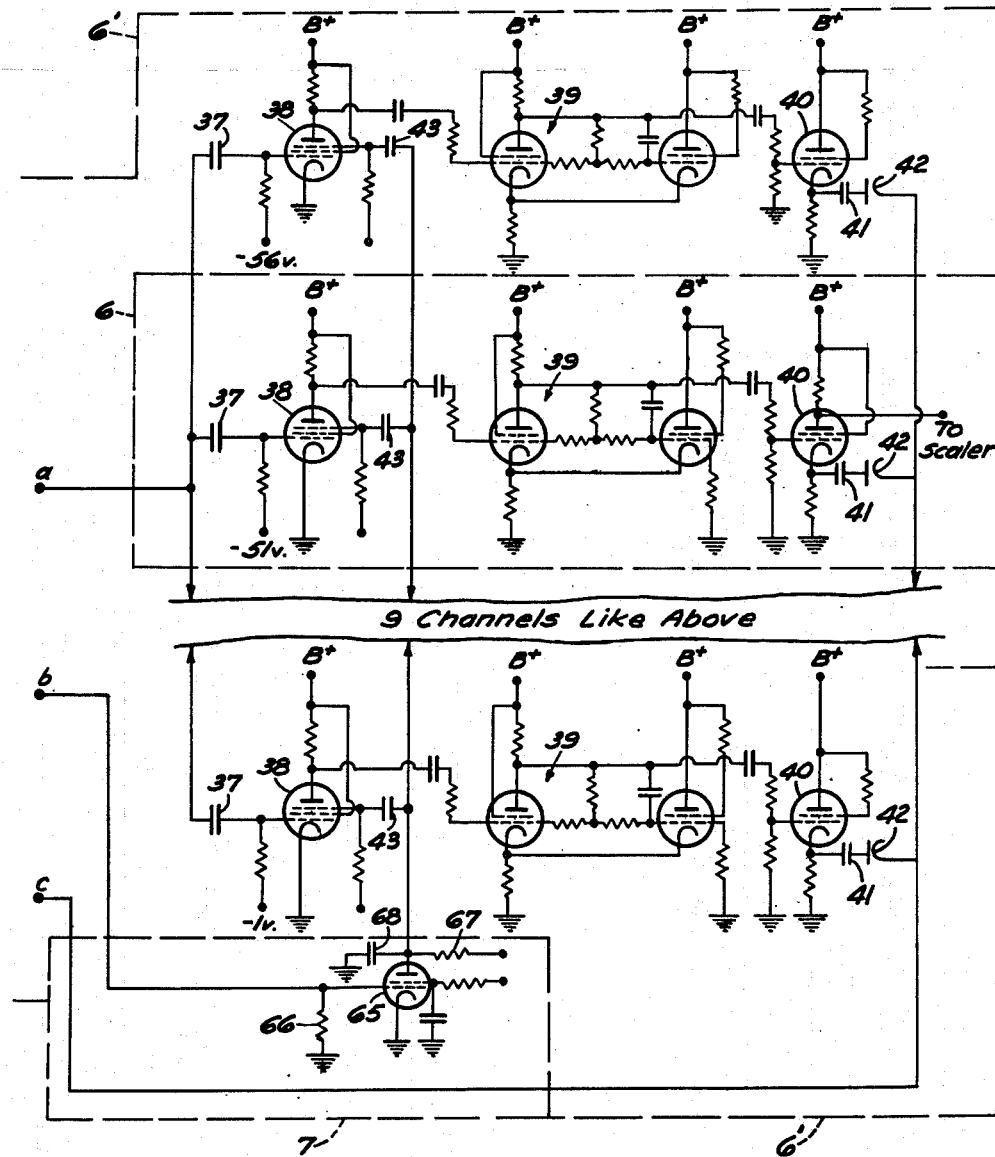
Figure 3:
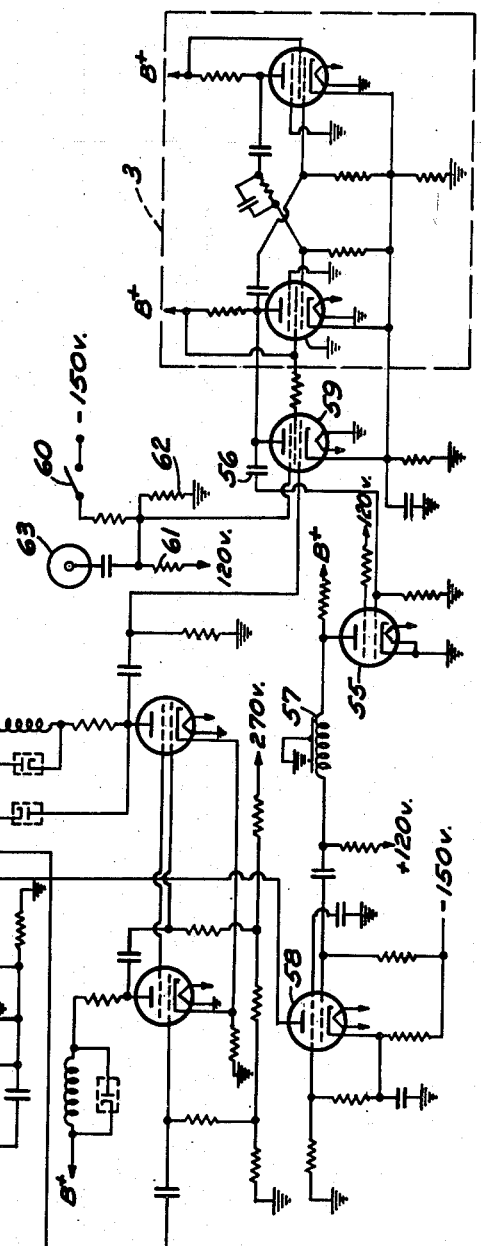
Figure 3:
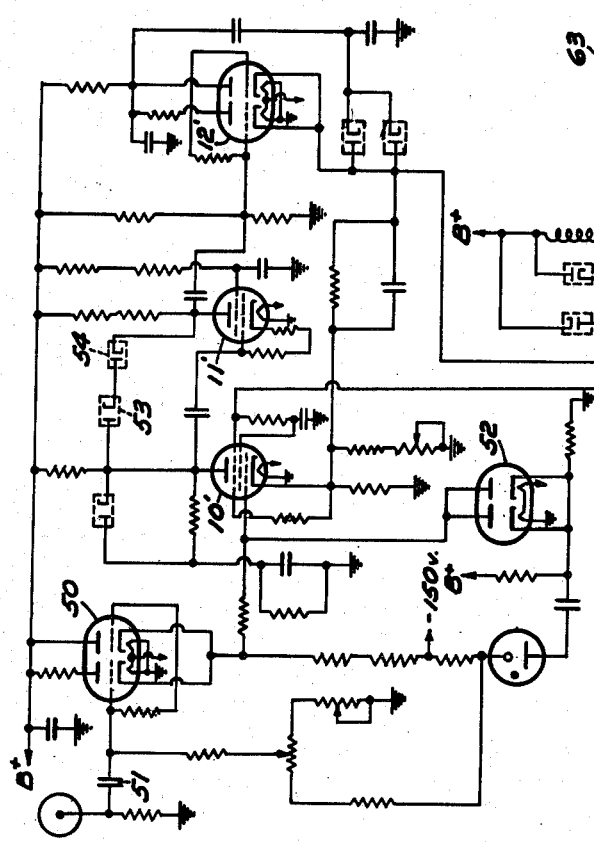

In the drawings, Fig. 1 is a block diagram of my improved multi-channel analyzer. Figs 2a and 2b are partial schematic showings of suitable circuits which may be employed in my improved multi-channel analyzer. Fig. 3 is a schematic of an improved amplifier for use in my multi-channel analyzer.

Referring to the drawings in detail, and particularly to the block diagram of Fig. 1, reference numeral 1 designates an amplifier which is similar to one of the feedback group in a conventional amplifier except that it has been modified for overload conditions. Amplifier 1 feeds through a pulse lengthener 2 into a series of time sequence discriminator channels 6, 6' which are biased to operate at progressively greater potentials. The operation of the pulse lengthener 2 is controlled by a multi-vibrator 3 which acts through an electronic switch 4 coupled to the pulse lengthener 2. The multi-vibrator 3 also serves to control the operation of a sweep generator 7 which renders the discriminators 6, 6' operative in time sequence in such a way that no output signal is obtained until the discriminator operated by the crest of the signal has been found. The operation is carried out by a rising potential to the various channels or time sequence discriminators 6, 6' until one of them becomes operative at the crest of the signal, thereby introducing a delay. The resulting signal is then counted or recorded at 9 and serves to stop the search for signals by operating the multi-vibrator 3 to halt the sweep 7 and also render the pulse lengthener 2 inoperative.

The operation of the multi-vibrator 3 is controlled by a trigger-on circuit 5 fed by amplifier 1, and a trigger-off circuit 8 fed from the time sequence discriminators 6, 6'. The intermediate channels 6, 6 feed into scalers 9, 9 for recording the counts. For a ten channel analyzer these channels 6 number ten, and in addition, there are two outer channels 6', making a total of twelve channels. The lower channel 6' resets the analyzer after receiving pulses below the minimum window as set by adjustment of amplifier 1, while the upper discriminator 6' resets the analyzer after receiving a pulse greater than the maximum window set by adjustment of the amplifier 1.

In its operation, scintillation spectrometers and/or other radiation counters (not shown) are used to produce voltage pulses whose amplitudes are proportional to the energy of incident radiation. The pulses representing a portion of the spectrum are amplified by the conventional amplifier (not shown), and the amplified counting pulse is applied at the input of "window" amplifier 1. A D. C. level control such as a potentiometer in the input circuit of the amplifier, as described more in detail hereinafter, preferably selects an .8 volt signal which produces a five volt increment at the output of the amplifier. Signal from amplifier 1 is then fed into a gated pulse lengthener 2, and through another circuit where it is employed to control an electronic switch 4 which operates or opens the gate. The tubes of switch 4 are normally operating but are cut-off by the multi-vibrator which is responsive to pulses greater than about 3 volts. The pulse lengthener 2, previously a linear circuit, becomes non-linear and holds the peak value of the signal voltage, applying it to a bank of gated discriminators. When the pulse lengthener 2 is rendered operative, the first diode of the two diodes, responds rapidly to the rising input signal but holds maximum value for a very short time. The second diode, described more in detail hereinafter, of the pulse lengthener 2, maintains a nearly constant level proportional to the maximum value of the signal for the necessary time. The lengthened pulse from the pulse lengthener 2 applied to the twelve time sequence discriminators 6, 6' acts simultaneously upon them since they are connected in parallel. As the D. C. level of the pulse is made progressively 5 volts less negative from tube to tube by biasing their inputs, a given size pulse will cause the input control grids of some of the discriminators to rise high enough to permit the tubes thereof to conduct. Plate current will not flow, however, and the discriminators will not become operative since the tubes are otherwise biased beyond the cut-off. The effect of this latter bias is overcome by the action of sweep generator 7 which is started by the triggering of the multi-vibrator 3 into operation. Thus by means of an approximately linearly rising voltage the discriminators are allowed to operate in time sequence until the first discriminator whose input is above cut-off is reached. Operation of this discriminator provides an input pulse to its respective scaler 9, and at the same time, actuates trigger-off circuit 8 to return the multi-vibrator 3 to the no signal condition, and resets the pulse lengthener and sweep generator or circuit. About 5 micro-seconds are required to search all channels and reset the unit. With the above arrangement and during this time, none of the other discriminators are permitted to operate.

Referring now more particularly to the schematic of Fig. 2, the amplifier of block 1 is generally a conventional resistance coupled amplifier with a cathode follower feedback. In this arrangement, pentodes 10, 11 act to amplify the signal and pentode 12 acts as a cathode follower. The feedback circuit is indicated at 13. Pentode 10 is preferably of the 6BN6 type since this type of tube draws only a small grid current on overload signals. Coupled to the control grid of the pentode 10 through the usual grid resistor 17, is potentiometer 16 which may take the form of a "helipot." This potentiometer is coupled through resistors and another potentiometer of conventional form to a source of biasing potential (not shown). Connected to the output circuit of the pentode 10 between the plate and the load resistor 18 is the anode of a diode 14, the cathode of which is grounded through resistor 19 and capacitor 20 in parallel. The diode circuit thus provides a by-pass to ground around pentode 10. In the output circuit of pentode 11, a diode 15 is bridged across the load resistor 21 through a resistor 22. However, in this instance, the cathode of diode 15 is joined to the plate of pentode 11, and the anode thereof is grounded through a by-pass condenser 23.

In its operation, pentode 10 is normally biased to cut-off through potentiometer 16, while pentode 11 is normally maintained in operative condition. Under these circumstances, the potential at the plate of pentode 10 is such that diode 14 is operating, and this maintains a drop across load resistor 18. Pentode 11 is normally operating, and the current flow through the load resistor 21, as a result thereof, creates a voltage drop across the resistor of such magnitude as to cause diode 15 to conduct. When small signals which operate the tube down on the knee of the characteristic curve of output voltage vs. input voltage, are applied to the control grid of tube 10 they do not operate the tube sufficiently to cause the diode 14 to cease operating, and this results in maintaining the output or anode voltage of tube 10 at substantially constant magnitude. Therefore, no subsantial voltage change appears at the control grid of tube 11, and such tube remains in operation. Since the drop across load resistor 21 is not materially effected, diode 15 likewise remains in operation. However, when larger signals appear at the control grid of tube 10, this tube operates on the linear portion of the characteristic curve, and more current is drawn by it. This causes the diode 14 to cease operating and as the potential at the plate of the tube 10 falls, a negative pulse is impressed upon the control grid of tube 11 of such size as to cause it to conduct less current. This raises the potential of the plate of tube 11, reduces the drop across load resistor 21, and extinguishes the diode 15. In this arrangement the diodes are so related that diode 15 ceases to conduct on slightly larger signals than diode 14. Thus it will be seen that the diodes 14, 15 are provided to increase sharpness of transition of the amplifier from no gain to feedback stabilized gain, as the control grid of the pentode 10 is brought above cut-off. This results in keeping the amplifier on the linear part of the characteristic curve.

The multi-vibrator 3 with tubes 24, 25 is of well known and conventional form, such as disclosed in Hoag on Basic Radio, published by D. Van Nostrand Company in 1942, pages 94 and 235, or in Elmore and Sands on Electronics, published by McGraw Hill Book Company in 1949, pages 81 to 83.

The electronic switch 4 coupled to the multi-vibrator 3 through capacitor 26 is comprised of two pentodes 27, 28 and is biased sufficiently to permit them to remain normally operative. The anodes of these tubes are then connected through resistors 29, 30 to the cathode of diodes 31, 32 of the pulse lengthener 2. In the pulse lengthener 2, the diode 31 serves to couple the pentode or cathode follower 33 to the cathode follower 12 of amplifier 1, while diode 32 serves to couple the second cathode follower 34 to the first cathode follower 33. Diode 31, 32 are normally maintained in conducting condition by the operation of tubes 27, 28 of the electronic switch 4. Thus small pulses and noise from the amplifier 1 which are unable to trigger the multi-vibrator 3, are amplified in a linear manner and are passed on through the pulse lengthener 2. However, when a pulse of sufficient magnitude to trigger the multi-vibrator 3 is received, such pulse upon triggering the multi-vibrator 3, impresses a negative pulse through condenser 26 upon the grids of tubes 27 and 28 of the electronic switch 4 of sufficient magnitude to cut-off these tubes and render them inoperative. This has the effect of rendering the diodes 31, 32 operative in such a manner as to provide a low resistance path for current during the rise of a pulse, charging the circuit capacity, but a high resistance path during the fall of the pulse. This maintains the crest value of the input signal on the control grid of the tube 33 fed through diode 31, and causes it to increase conduction. The diode 32 acts in a similar manner, except the capacitor 35 bridged across the input grid circuit of tube 34 to ground, charges up through resistor 36, so that diode 32 will hold to the crest longer by reason of the added capacity from capacitor 35 which is preferably 150 M. M. F. It will thus be seen that tube 33 is used to isolate the two diodes 31, 32, and the second cathode follower 34 is incorporated in the circuit to provide a low impedance output.

The output of the cathode follower 34 is coupled through capacitors 37, 37 to the number one grids of the first tubes 38, 38 in the twelve time sequence discriminator channels 6, 6', only three of which are shown in the interest of avoiding unnecessary duplication. These first tubes 38, 38 are followed by a Schmitt trigger circuit, such as is described in Elmore and Sands on Electronics, supra, pages 99 to 103, and generally designated 39. The output of the Schmitt trigger circuit feeds into tube 40 in each channel. The anode circuits of the tubes of the intermediate channels are then coupled to conventional scalers which are triggered by negative pulses from the tubes 40. The cathode circuits of these tubes in each channel are coupled through circuits of series connected capacitors 41, and diodes 42, to the input of trigger-off circuit 8 which serves to trigger the multi-vibrator 3 in the opposite direction.

The number one grids of tubes 38, 38 in the twelve channels are biased by progressively greater negative potential with the first tube of the uppermost channel being biased to the greatest voltage, and the first tube of the lowermost channel having the smallest bias. For instance, the bias on the number one grid of the first tube of the upper channel may be −56 volts, and that on the corresponding tube in the second channel, may be −51 volts, and so on in 5 volt intervals until the lower channel will be biased at −1 volt.

The number three grids of the same tubes are also negatively biased but in the opposite order, that is, the lower channel carries the most bias, and the upper channel the least. For instance, the bias on the third grid of the tube 38 in the lower channel might be −68 volts, while the bias in the next channel above it would be −63 volts, and so on until the bias of the corresponding tube in the upper channel might be −13 volts.

In addition to the above, the third grid of the first tube 38 in each channel is coupled through a capacitor 43 to the output of a conventional vacuum tube saw-tooth or linear sweep circuit 7 which is itself coupled through a capacitor 44 to the output of the multi-vibrator 3. One type of conventional sweep is described on page 43 of Chance et al. on "Wave Forms" identified as vol. 19 of The Radiation Laboratory Series published by McGraw Hill Co. Inc., of New York, N. Y., in 1949.

The sweep 7 which is coupled to the multi-vibrator 3 through capacitor 44 comprises, in this instance, a tube 65 having its control grid connected to ground through grid resistor 66. The cathode is maintained at ground potential and the screen grid and plate are fed from supply sources of 120 volts and 250 volts, respectively. This permits the tube 65 to conduct, lowering the potential at the plate to a point representing the drop across load resistor 67. The operation of the multi-vibrator 3 in response to a pulse from trigger-on circuit 5 puts a negative pulse on the control grid of tube 65 causing it to cease conducting, and this permits the voltage at the plate of the tube to rise exponentially towards B+ potential as capacitor 68 charges up through resistor 67. However, operation of one of the discriminator channels 6, 6' reverses the multi-vibrator, and this places a positive pulse on the control grid of tube 65 causing it to have increased conduction, which tends to lower the potential of the anode of the tube, and facilitates the discharge of condenser 68. It is thus seen that the potential of the output of the sweep will rise until the incoming signal or pulse trips the discriminator and halts the sweep. The magnitude of the signal will determine the channel 6, 6' selected for operation, and will thus determine the length of operation of the sweep.

In the arrangement of Fig. 2, tube 38 of the upper or first channel or discriminator, operates on a grid voltage in the region of from about +4 volts down to about —1 volt before the first tube 38 in the second or next lower channel operates or takes over. This five volt operating interval between channels is maintained on down the line to the last or lower channel. Thus when the tube 38 operates as a result of the signal level of a pulse and the action of the sweep 7, a pulse through the Schmitt circuit 39 of that channel is fed to the tube 40 and diode 42. This applies a positive pulse to the trigger-off circuit 8 and triggers the multi-vibrator 3 in the opposite direction. This serves to operate the electronic switch 4 to return the diodes of the pulse lengthener 2 to the linear conducting stage. The action of the multi-vibrator also resets or renders the sweep circuit inoperative, and prevents any of the other channels from having their first tubes raised to the point of conduction by the pulse. It is thus seen that the multi-vibrator 3 in response to the operation of one channel functions in two ways to prevent false operation of the other channels, that is, (a) suspends the operation of the sweep 7 and halts the rise of potential applied from the sweep circuit to the third grid of the first tube 38 of each of the channels 6, 6', thereby tending to insure that they remain inoperative, and (b) disables the pulse lengthener 2 and removes pulses from the number one grid of the same tube in each channel.

In the trigger-on circuit 5 shown in the block enclosure, a Schmitt trigger circuit may be interposed between the amplifier 1 and the tube 45 in order to supplement the trigger-on arrangement and to provide for improved operation and better performance.

Referring to the improved amplifier of Fig. 3, this amplifier responds much faster than the conventional amplifier 1 of Fig. 2 and enables the system to respond to faster input signals. In this arrangement, tubes 10', 11' correspond to tubes 10, 11 of amplifier 1 of Fig. 2 and cathode follower 12' corresponds to the cathode follower 12 of Fig. 2, and to that extent the amplifiers of Figs. 2 and 3 are similar. However, to prevent shift of bias due to flow of grid current in tube 10', a cathode follower 50 is coupled in the input circuit of tube 10' and serves to feed that tube. The cathode follower 50 then acts to isolate the first amplifying tube 10' from condenser 51. A double diode 52 is also in the input circuit of the first amplifying tube 10' and is bridged from the first or control grid of that tube to ground and prevents such grid from drawing excessive current, since the characteristics of the double diode are so chosen that it operates at about the point where tube 10' would draw grid current.

The coupling between the two amplifying tubes 10', 11' has also been altered from that of the corresponding amplifier of Fig. 2 by using two diodes 53, 54 in series between the plates or anodes of these tubes. Two diodes were preferred instead of one in order to handle the voltage. In this arrangement, the transition between no gain and stabilized gain is much sharper, since the characteristic curve is of much greater slope at the knee of the curve.

Another feature of this improved amplifier of Fig. 3 is a circuit which renders the amplifier inoperative during the search for a signal already in the analyzer, that is, where a pulse is already being counted. This circuit is intended to prevent false operation of several channels of the analyzer when a large pulse is impressed on the counting channel while they are already operative. This is accomplished by coupling tube 55 through capacitor 56 to the output circuit of the multi-vibrator 3, and this serves to pass the multi-vibrator pulses to delay line 57 which delays the signal sufficiently long to prevent the amplifier from being turned off or rendered inoperative until after the crest of the signal is reached. The signal from the delay line is coupled through tube 58 to the suppressor grid of the first amplifying tube 10'. In this way a negative signal is applied to the suppressor grid of amplifying tube 10' of length equal to the length of the multi-vibrator pulse and delayed by the length of delay introduced by the delay line 57. This pulse is of sufficient magnitude to prevent amplifying tube 10' from passing signals.

As a further feature arising in connection with this amplifier, provision has been made for externally gating the amplifier for use in coincidence spectrometry. The trigger-on tube 59 is preferably type 6AS6 and is gated by a signal from an external source which is impressed upon its number three or suppressor grid. The external gating signal is applied to the number three grid of tube 59 from a circuit in the amplifier. For this purpose a switch 60 is provided. When the switch 60 is in the "off" position the gating circuit is in control of the operation of the trigger-on tube 59, and when such switch is in the "on" position the trigger-on tube functions in the usual manner. For instance, when switch 60 is in the open or "on" position bleeder resistors 61, 62 have a drop across them resulting from the 120 volt potential impressed across them to ground and this places a positive bias on the third grid of tube 59 which will permit a signal on the control grid of the tube to trigger it in the usual manner. However, when the switch 60 is in the "off" position the circuit is completed and a negative bias of —150 volts is impressed upon the network including resistors 61, 62 which results in a small net negative bias for the third grid of tube 59. This will normally prevent such tube from operating and it will be seen that to render the trigger-on tube 59 operative, a positive pulse from the external gating source (not shown) is applied through terminal 63 to the third grid of tube 59. This gate or pulse is controlled from another analyzer (not shown) so that this analyzer is rendered operative only when the associated analyzer is receiving a signal.

Having thus described my invention, I claim:

1. A multi-channel analyzer for determining pulse distribution comprising a window amplifier for selecting pulses within a predetermined voltage spectrum, a pulse lengthener fed by the amplifier for sustaining the crest of the pulses, a series of parallel connected discriminators coupled to the pulse lengthener, the discriminators of said series being biased to operate at different potentials, means for applying a rising gating potential to the discriminators of said series to render them operative in time relation, and means for scaling pulses from said discriminators.

2. A multi-channel analyzer for determining pulse distribution comprising a window amplifier for selecting pulses within a predetermined voltage spectrum, a gated pulse lengthener fed by the amplifier for sustaining the crest of the pulses, a series of parallel connected discriminators fed by the pulse lengthener, each discriminator of said series being biased differently so as to respond to progressively larger pulses, and means for applying a rising gate simultaneously to the discriminators to permit their selective operation in response to signals from said pulse lengthener.

3. A multi-channel analyzer for determining pulse distribution comprising a window amplifier for selecting a predetermined voltage range of pulses, a gated pulse lengthener fed by the amplifier for maintaining the crest of the pulse, means responsive to pulses in the amplifier for gating the pulse lengthener to render it operative, a series of biased discriminators coupled in parallel to the pulse lengthener, said discriminators being biased differently to respond to pulses of different magnitude, and means for applying a rising gate to said discriminators to render them operative in time relation.

4. A multi-channel analyzer for determining pulse distribution comprising a window amplifier, means for altering the position of the window to progressively cover the voltage spectrum, a pulse lengthener coupled to the output of the amplifier and responsive to pulses therefrom to sustain them at their crest, and a plurality of discriminators fed by said pulse lengthener and responsive to pulses of progressively greater magnitude for operating them.

5. A multi-channel analyzer for determining the distribution of voltage pulses comprising a window amplifier, a direct current control for the input of the amplifier to sweep the voltage spectrum, a pulse lengthener fed by the amplifier for sustaining the crest of pulses fed thereto, and a plurality of parallel connected discriminators coupled to the pulse lengthener for receiving pulses therefrom, said discriminators being biased to progressively greater potentials for selectively passing said pulses.

6. A multi-channel analyzer for determining the distribution of voltage pulses comprising a window amplifier, a direct current control for adjusting the bias of the amplifier over a predetermined range for sweeping the voltage spectrum, a pulse lengthener fed by the amplifier for sustaining the crest of voltage pulses, a plurality of parallel connected discriminators coupled to the output of the pulse lengthener, said discriminators being biased to progressively greater potentials to selectively pass the pulses from said pulse lengthener, and means for scaling the pulses from the discriminator.

7. A multi-channel analyzer for determining the distribution of voltage pulses comprising a window amplifier, a direct current control device for adjusting the bias of the amplifier over a predetermined range for sweeping the voltage spectrum, a gated pulse lengthener fed by the amplifier for sustaining the crest of the voltage pulses, means responsive to pulses from the amplifier for gating the pulse lengthener, and a plurality of parallel connected discriminators coupled to the pulse lengthener, said discriminators being biased to progressively greater potentials for selectively passing the pulses from the pulse lengthener.

8. A multi-channel analyzer for determining the distribution of voltage pulses comprising a window amplifier, a direct current control device for adjusting the bias of the amplifier for sweeping the voltage spectrum, a pulse lengthener fed by the amplifier for sustaining the crest of the pulses, a plurality of parallel connected biased discriminators coupled to the pulse lengthener, and means for applying a rising gate to the discriminators to cause them to operate in time relation to selectively pass the pulses from the pulse lengthener.

9. A multi-channel analyzer for determining the distribution of voltage pulses comprising a window amplifier, a direct current control basis for adjusting the bias of the amplifier for sweeping the voltage spectrum, a gated pulse lengthener fed by the amplifier for sustaining the crest of the pulses, means responsive to pulses from the amplifier for gating the pulse lengthener, a plurality of parallel connected biased discriminators coupled to the pulse lengthener, and means for applying a rising gate to the discriminators to cause them to operate in time relation to selectively pass the pulses from the pulse lengthener.

10. A multi-channel analyzer for determining the distribution of voltage pulses comprising a window amplifier, a direct current control device for adjusting the bias of the amplifier for sweeping the voltage spectrum, a pulse lengthener fed by the amplifier for sustaining the crest of the pulses, a plurality of parallel connected biased discriminators coupled to the pulse lengthener, means for applying a rising gate to the discriminators to cause them to operate in time relation for selectively passing pulses from said pulse lengthener, and means responsive to signals from the amplifier for controlling the operation of said last named means.

11. A multi-channel analyzer for determining the distribution of voltage pulses comprising a window amplifier, a gated pulse lengthener fed by the amplifier for sustaining the crest of the pulses, means responsive to pulses from the amplifier for gating the pulse lengthener, a plurality of parallel connected biased discriminators for selectively passing the pulses from the pulse lengthener, a sweep for applying a rising gate to the discriminators to render them operative in time relation, and means responsive to pulses from the amplifier for controlling the operation of the sweep.

12. A multi-channel pulse analyzer for determining the distribution of voltage pulses comprising a window amplifier, a direct current lense for adjusting the bias of the amplifier for sweeping the voltage spectrum, a gated pulse lengthener fed by the amplifier for sustaining the crest of the pulses, means responsive to pulses from the amplifier for gating the pulse lengthener, a plurality of parallel connected biased discriminators for selectively passing the pulses from the pulse lengthener, a sweep for applying a rising gate to the the discriminators to render them operative in time relation, and means responsive to pulses from the amplifier for controlling the operation of the sweep.

GEORGE G. KELLEY.

References Cited in the file of this patent

UNITED STATES PATENTS

| Number | Name | Date |
|---|---|---|
| 2,529,666 | Sands | Nov. 14, 1950 |